June 10, 1969 E. H. MEDLEY 3,448,960
SOLENOID VALVE
Filed April 22, 1966 Sheet 1 of 2

INVENTOR.
EDWARD H. MEDLEY
BY
*Stephen M. Mihaly*
ATTORNEY

June 10, 1969  E. H. MEDLEY  3,448,960
SOLENOID VALVE

Filed April 22, 1966  Sheet 2 of 2

INVENTOR.
EDWARD H. MEDLEY
BY Stephen M. Mihaly
ATTORNEY 3,448,960
SOLENOID VALVE
Edward H. Medley, Grand Rapids, Mich., assignor to Pneumo Dynamics Corporation, Cleveland, Ohio, a corporation of Delaware
Filed Apr. 22, 1966, Ser. No. 544,425
Int. Cl. F16k 1/14, 31/04
U.S. Cl. 251—129                           9 Claims

ABSTRACT OF THE DISCLOSURE

A miniature valve for fluid flow control having a permanent magnet and spring arrangement for latching in either the open or closed position. A pulse actuated electromagnet provides the valve operating force and a particular armature-pole piece configuration, providing a variable effective radial air gap, encourages secure latching while requiring only a minimum of power for the valve operation. All magnetic components of the valve are completely encapsulated for isolation from the fluid under control.

Disclosure

This invention relates to a solenoid valve and more particularly to a pulse-actuated magnetic latching solenoid valve for controlling the flow of corrosive fluids.

An object of this invention is to provide a solenoid valve of improved design for use in portable applications where power consumption is critical, wherein permanent magnets and springs supply continuous latching forces and only a short electrical pulse is required to cycle the valve.

Another object of this invention is to provide a solenoid valve wherein the armature is of special configuration to facilitate the latching operation, thus enabling the construction of a small, lightweight, portable unit.

Still another object of this invention is to provide a solenoid valve wherein the armature and magnetic excitation devices are completely sealed, without unduly increasing the size or mass of the valve, and without degrading performance, so that highly corrosive fluids may be controlled.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

Figure 1:
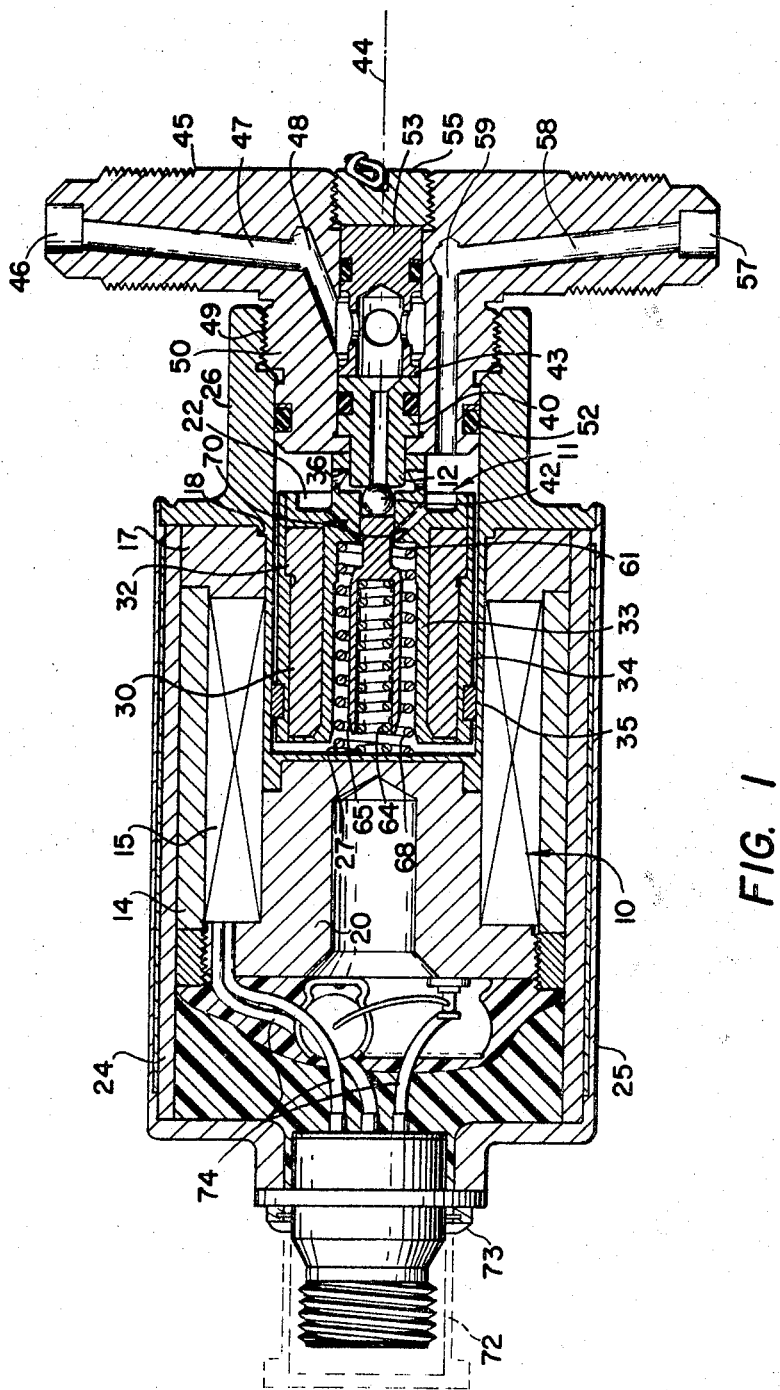
FIG. 1 is a cross sectional view of the solenoid valve showing the valve in the closed position.

Referring now to FIG. 1 the magnetic latching solenoid consists generally of an energization section 10, a moving armature 11, and a fluid valve 12. The energization section comprises an annular permanent magnet 14 and an annular electromagnetic coil 15, with the coil disposed radially inwardly of the permanent magnet. An upper pole piece 17 is located to the right of the coil 15 and permanent magnet 14 as viewed in FIG. 1 and is of generally annular configuration with a notch 18 at its inside right hand corner. A lower pole piece 20 of generally cylindrical shape is disposed toward the left hand end of the coil 15 and permanent magnet 14 and partially within the confines of the annular coil. The upper 17 and lower 20 pole pieces and the permanent magnet 14 and coil 15 act together to provide a source of magnetic flux for moving the plunger assembly 22 of the valve. The energization means 10 are contained within a cylindrical spacer 24 and the entire unit is contained within a stainless steel cylindrical cover 25 which acts as a magnetic shunt and shield and whose relationship to the operation of the solenoid will be more fully explained hereinafter. A barrier member 26 of a generally closed and 27 tubular configuration serves to retain the energization means 10 within the cover 25, and provides a sealing barrier which is impervious to the fluid being controlled, such that it is not affected by the fluid nor does it affect the purity of the fluid under control. The barrier is welded or brazed into position on the inside circumference of the cover 25 at the right hand end thereof and is similarly bonded to the lower pole piece 20.

The moving armature 11 comprises a plunger assembly 22 which is slidable axially within the barrier member 26 under the force of the magnetic field created by the energization section 10. A plunger core 30 of tubular shape with a stepped end section 32 is encapsulated within a liner 33 and a sleeve 34 and the assembly 22 is supported for axial movement by an annular bearing ring 35 near one end and a sliding engagement 36 at the other end. The plunger core 30 is made of a high permeability magnetic material and is secured to the liner 33 by cement or by other means. The sleeve 34 is bonded to the liner 33 and it has been found that electron beam welding is the most feasible method for accomplishing this.

The fluid valve 12 comprises a valve seat 40 and a ball closure member 42 which either abuts or is spaced a distance from the valve seat 40 to prevent or allow the flow of fluid therethrough. The valve seat 40 is supported within a bore 43 along the central axis 44 of T-fitting 45 and communicates with an inlet connection 46 by way of holes 47, 48 drilled in the T-fitting. The T-fitting 45 is retained in the barrier 26 by means of the coaction of tapered splines 49 on the inside diameter of the barrier 26 at the right hand end thereof and the outside diameter of the hub 50 of the fitting. Sealing is provided by means of a packing ring 52 located between a stepped-down portion of the hub 50 of the fitting 45 and an inside diameter of the barrier 26. A sealing member 53 carrying a packing ring and retaining means 55 serve to close the bore 43 in the hub of the fitting 45. The valve seat 40 protrudes out from the bore 43 and its exposed outside periphery provides a supporting surface for the right hand end of the plunger assembly 22. An outlet connection 57 is provided at the T-fitting and communicates with the interior chambers of the valve by way of drilled holes 58, 59 in the T-fitting 45.

The plunger assembly 22 contains the ball closure means 42 of the fluid valve 12 for movement therewith in a left hand direction as viewed in FIG. 1, in a bore 61 in the plunger assembly 22 which is slightly constricted at the right hand end thereof. A spring 64 and a spring guide and ball abutment member 65 which is axially slidable and constrained within the bore 61 of the plunger assembly 22 bias the ball closure means 42 against the constricted portion of the bore 61 and retain the ball 42 for movement with the assembly 22. This construction thus provides a pressure relief bias for the fluid valve 12 when it is in its closed position. A sapphire ball is used in this embodiment as the ball closure means 42 or operative portion of the fluid valve and the force of opening for the pressure relief may be adjusted by proper design of the spring 64. When excessive pressure is received at the inlet port 46 and thus at the valve seat 40, it tends to move the ball 42 to the left as seen in FIG. 1, against the guide 65 and the force of the spring 64 leaving the remainder of the plunger assembly 22 stationary. A helical coil spring 68 is located between the plunger assembly 22 and the end wall 27 of the barrier 26 and biases the plunger assembly toward the right as viewed in FIG. 1, so that the ball closure means 42 abuts the port in the valve seat 40. The plunger assembly also has communication ports 70 drilled through the body thereof so that no damping effects occur when the assembly is sliding.

An electrical connector 72 is mounted on the left hand end of the cover 25 by means of bolts 73 and serves to receive power from an external source. Wire connectors 74 are made between the electrical connector 72 and the electromagnetic coil 15 and carry the current for energization of the coil. In the steady-state condition of the solenoid the magnetic field surrounding the permanent magnet 14 is directed by the upper 17 and lower 20 poles to define a path of magnetic flux between the poles, generally in the area of the plunger assembly 22. The path of flux is from the permanent magnet 14, through the upper 17 pole, the air gap between the upper pole 17 and the plunger core 30, the plunger core 30, the air gap between the plunger 30 and the lower pole 20, and through the lower pole 20 back to the permanent magnet 14. The upper 17 and lower 20 poles are of relatively soft iron having a high permeance, so that the magnetic field passes readily through these poles. When the electromagnetic coil 15 is energized it also produces a magnetic field which is directed by the pole pieces 17, 20 and which may either increase or decrease the magnetic field developed by the permanent magnet 14, depending on the dirction of current flow through the coil.

Figures 2A, 2B:
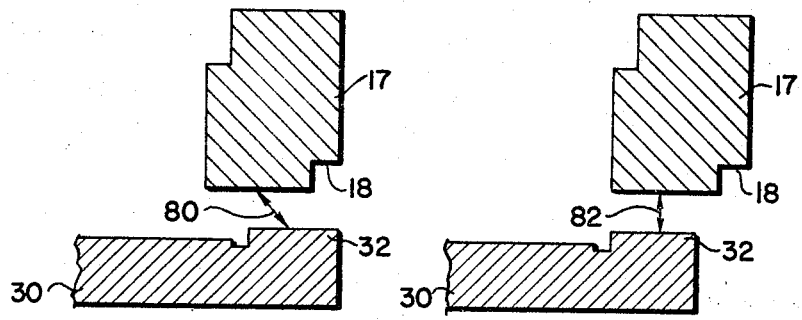
FIGS. 2a and 2b are schematic representations showing the relationship of the different positions of the plunger of the armature to the upper pole piece.

Referring now to FIG. 2, it is seen that the notch 18 in the configuration of the upper pole piece 17 and the stepped end 32 of the plunger 30 provide a means of varying the common surface area of the parts defining one of the air gaps in the system. When the plunger core 30 and the armature 11 are in the valve closed position as viewed in FIG. 1 or in FIG. 2a, the closely adjacent surface areas of the upper pole piece 17 and the plunger core 30 are out of alignment. This presents a minimal common surface area and therefore increased reluctance for the path of magnetic flux between the upper pole piece 17 and the plunger core 30. Another way to state this is that the average length of the air gap has been increased as shown by the length of line 80 in FIG. 2a, as compared with the length of line 82 in FIG. 2b. The force thus induced in the plunger core 30 is at a low value and is sufficiently low so that it does not overcome the bias of the spring 68 or other external force holding the plunger assembly 22 in the valve-closed position. At this time, the left end of the plunger core 30 as viewed in FIG. 1 is at its greatest distance from the lower pole piece 20, creating a relatively large air gap, and thus a high reluctance path for the magnetic flux. Thus it can be seen that the total reluctance of the path of magnetic flux between the pole pieces 17, 20, is at a relatively high value and a minimal quantity of force is induced in the plunger core 30.

When the plunger core 30 and armature 11 are moved to the left as viewed in FIG. 1 or in FIG. 2b, the surface area of the upper pole piece 17 and the surface area of the stepped end 32 of the plunger core 30 become aligned so that there is a maximum of common surface area or a minimum average length air gap producing an air gap of minimum reluctance. At this time the left end of the plunger core 30 is closest to the lower pole piece 20 with the left end of the plunger assembly 22 abutting the closed end 27 of the stainless steel barrier 26. Only the thickness of the barrier separates the plunger assembly 22 from the lower pole piece 20, thus reducing the reluctance of this magnetic flux path to a minimum. The force developed in the plunger core 30 is at a maximum and the density of the magnetic flux is adjusted so that it is sufficient to hold the armature 11 in this position. The only magnetic flux being generated at this time is that provided by the permanent magnet 14. The flux path is directed by the soft iron upper pole 17 and lower pole 20 so that a majority of the flux passes between these poles and through the plunger core 30. A certain amount of flux however, is shunted by the cover 25 of the solenoid. This cover 25 may be varied in thickness to produce a better shunt or adjusted in spacing from the permanent magnet 14 by means of the aluminum spacer 24 to decrease the effect of the shunt. Thus, although a permanent magnet of approximately the proper strength is installed in the solenoid, variations in the density of the magnetic field through the plunger assembly 22 can be made by externally changing the shunting effect of the cover 25. It has been found that a nameplate (not shown) mounted on the exterior surface of the cover 25 has an effect on shunting the magnetic field and may be used as a means of providing a final adjustment of the forces generated within the solenoid provided that it is made of a magnetically permeable material.

The foregoing description has shown the characteristics of operation of the solenoid valve when it is in a steady-state condition, i.e., in either an open or closed position. It has been shown that no external power has been employed to hold the valve in either of these positions, the retention in the open position being accomplished by a magnetic latching wherein there is no physical contact with the plunger assembly and the retention in the closed position being accomplished by a spring bias. The following description relates to the movement of the valve to either position by the pulsed application of power.

Figure 3:
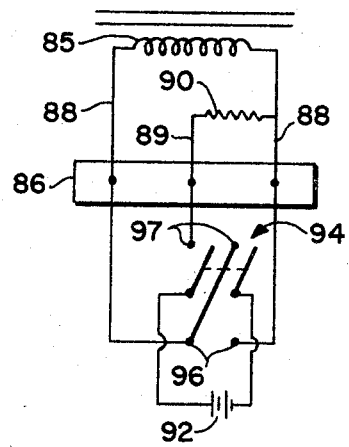
FIG. 3 is a schematic wiring diagram for the solenoid valve.

As seen in FIG. 3, the electromagnetic coil 85 within the solenoid is connected to the electrical connector 86 by two leads 88. A third lead 89 is connected from one side of the coil to the connector through a series resistance 90. An external power source 92 supplies power to the electrical connector 86 and the coil 85 through a polarity reversing switch 94 which may be of the type shown in FIG. 3. When the switch 94 is closed in the first position to contacts 96, current from the source 92 flows directly through the coil 85. When the switch 94 is closed in the second position to contacts 97, current flows through the coil 85 in the opposite direction and at a reduced amount due to the impedance of the resistor 90.

The flow of current through the electromagnetic coil 15 sets up a magnetic field about the coil in a manner well understood in the art. Since the magnetic axis of the coil 15 and of the permanent magnet 14 are substantially coincident the effect of the magnetic field contributed by the coil 15 is to either reinforce or diminute the magnetic field established by the permanent magnet 14 and directed through the pole pieces 17, 20 and plunger core 30.

When the switch is in the first position the direction of current flow through the coil 15 is such that the magnetic fields are aiding and set up a force in the plunger core 30 which tends to move the plunger assembly to the open position or to the left as viewed in FIG. 1. The length of time that the switch is in the first position should be of sufficient duration so that the plunger assembly 22 moves to the left a distance to bring the plunger core 30 to a position wherein the gap between the plunger core 30 and the lower pole piece 20 is small enough, and sufficient common surface area between the stepped-end 32 of the plunger core 30 and the inside surface of the upper pole piece 17 is attained, so that the reluctance of the path of magnetic flux is reduced and sufficient force is induced in the plunger core 30 from the magnetic field of the permanent magnet 14 alone, that the plunger assembly 22 will continue its transit to the left to its end position and be retained there. It has been determined that only a short pulse of current is necessary to accomplish the desired movement and accordingly the switch 94 may be a momentary connection type with a spring return to a neutral off position. Similarly, it would be sufficient if a pulse generator were employed to supply the momentary pulse of current.

When the switch is in the second position the direction of current flow through the coil 15 is reversed and the magnetic field of the coil 15 opposes and diminishes the continual magnetic field of the permanent magnet 14. The strength of the combined magnetic field induces insufficient force in the plunger core 30 to oppose the force of the springs 68 and 64 and the plunger assembly 22 moves to the right under the influence of the springs. In so moving the air gap at the left end of the plunger core 30 is being increased and the common surface area between the plunger core 30 and the upper pole 17 is being reduced to increase the reluctance of the magnetic flux path and thus accumulatively reduce the force induced in the plunger core 30. It may be seen that the reversed current flow need only occur for an interval long enough for the plunger assembly 22 to move a distance to the right so that the spring force overcomes the force induced in the plunger core 30 by the continual magnetic field from the permanent magnet 14. The spring force will then move the plunger assembly 22 to the right until movement is terminated by the ball 42 abutting the valve seat 40 and the plunger assembly 22 abutting the hub 50 of the T-fitting 45.

The resistance 90 is used in this embodiment to diminish the quantity of reverse current flow since design considerations dictate that the permanent magnet 14 may be only of sufficient size and strength to retain the plunger assembly 22 in its open position at the far left of its limits of slidable movement and a relatively short distance to the right thereof. This provides a margin of safety wherein the plunger assembly 22 may vibrate or be moved by external environmental shocks or forces and still retain its setting. To extend this margin substantially would require that a larger permanent magnet be used. Since only this relatively small distance must be traversed by the plunger assembly 22, it is seen that the magnetic field need by altered by a lesser extent than when causing the plunger assembly 22 to be moved into this range from a rest position at the right or valve closed position.

The approximate force induced in a plunger core 30 subject to a magnetic field of constant intensity is directly related, as in this embodiment, to the quantity of common surface area and indirectly related to the square of the length of the air gap in the flux path. Thus it can be seen that the change in common surface area between the plunger core 30 and the upper pole 17 and the change of length of the air gap between the plunger core 30 and the lower pole 20 produce a cumulative effect to create a maximum force in the plunger core 30 when it is at its left hand position and a minimum force when it is at its right hand position.

The force of the return spring 68 and pressure relief spring 64 is directly related to the length of their compression so that they exert a maximum force when the plunger assembly 22 is to the left and a minimum force when the assembly is to the right. It is necessary that the springs exert sufficient force when the plunger assembly 22 is to the right or in the valve closed position, well as the above-mentioned transient external shock to accomodate the force of the fluid under control as forces.

Thus it can be seen that both the force of the springs 64, 68 and the force induced in the plunger core 30 by magnetic induction increase as the plunger core 30 is moved to the left. It is necessary that the induced force in the plunger core 30 overcome the spring force during this transit in order to attain a latching condition. Since the plunger assembly 22 is limited in its left hand movement due to its abutment with the closed end 27 of the encapsulation barrier 26 it has been determined that the change in common surface area between the plunger core 30 and the upper pole 17 is critical to and enables the construction of this superior performance latching solenoid valve.

I, therefore, particularly point out and distinctly claim as my invention:

1. A magnetic latching valve for controlling the flow of fluids comprising a tubular housing, a first pole piece of magnetic material disposed in said housing, forming the closed end section of an axially extending armature enclosure, an annular second pole piece of magnetic material disposed in said housing forming the open end section of the armature enclosure, a permanent magnet having axially oriented poles disposed between said pole pieces for setting up a continual flow of flux in the armature enclosure, an electromagnet operatively associated with said pole pieces, an armature of cylindrical configuration mounted for slidable movement between first and second positions in such enclosure, a fluid valve operatively connected with said armature for actuation thereby to a closed or open condition, means for biasing said armature to the first position, said armature extending between said pole pieces to form, in the first position, an axial air gap between one end of said armature and said first pole piece and a radial air gap between the second end of said armature and said second pole piece, said biasing means having sufficient force for retaining said armature in the first position and the continual flux of said permanent magnet being sufficient to retain said armature in the second position, and means for varying the flow of continual flux, said flow varying means comprising means for varying the effective radial air gap between the second end of said armature and said second pole piece during movement of said armature, whereby said armature will be moved to and retained in the first and second positions upon decrease and increase, respectively, of such continual flux.

2. The valve as set forth in claim 1 wherein said means for varying the continual flux comprises means for momentarily energizing said electromagnet.

3. The valve as set forth in claim 2 wherein the means for varying the effective radial air gap between said armature and said second pole piece comprises a radially outwardly stepped second end section of said armature, said stepped end section being positioned with respect to said second pole piece to be in axial alignment therewith when said armature is in the second position, and partially in alignment with said second pole piece when said armature is in the first position, thereby to present different common surface areas and thus different air gaps between said end section and said second pole piece.

4. The valve as set forth in claim 3 wherein said second pole piece includes a notch in the inner periphery and at the outer axial portion thereof, said notch having an axial length substantially equal to the distance between the first and second positions of said armature.

5. The valve as set forth in claim 1 wherein said permanent magnet and said electromagnet are of tubular configuration and are concentrically disposed within said housing between said pole pieces, thereby forming a part of the axial portion of the armature enclosure.

6. The valve as set forth in claim 5 further including a member of nonmagnetic material having a closed end tubular portion and a radially extending flange, said tubular portion being contiguous with said first and second pole pieces and said flange being contiguous with said second pole piece and said housing, thereby forming a jacketed armature enclosure, said member being impervious to fluids within such enclosure.

7. The valve as set forth in claim 6 wherein said armature is of tubular configuration and includes a jacket of nonmagnetic material completely surrounding said armature, said jacket being impervious to fluids within the armature enclosure.

8. The valve as set forth in claim 7 wherein said armature jacket forms a central axial chamber within said armature, said means for biasing said armature to the first position being disposed in said chamber and further including a pressure relief mechanism disposed in said chamber, said mechanism being cooperable with said fluid valve when said armature is in the first position.

9. The valve as set forth in claim 8 wherein said armature jacket further includes an axially extending member and said fluid valve includes an axially extending stem, said jacket member adapted to slidingly engage said stem for support of said armature in the first and second positions.

References Cited

UNITED STATES PATENTS

| | | | |
|---|---|---|---|
| 2,562,536 | 7/1951 | Mayer | 251—129 X |
| 2,596,409 | 5/1952 | Johnson et al. | 251—129 X |
| 2,637,343 | 5/1953 | Matthews | 251—65 |
| 2,828,937 | 4/1958 | Kreitchman | 251—129 |
| 2,972,465 | 2/1961 | Ray | 251—65 |
| 3,022,450 | 2/1962 | Chase | 335—229 X |
| 3,040,217 | 6/1962 | Conrad | 335—234 |
| 3,119,940 | 1/1964 | Pettit et al. | 335—229 X |
| 3,178,151 | 4/1965 | Caldwell | 335—229 X |
| 3,203,447 | 8/1965 | Bremner | 251—129 X |
| 3,212,751 | 10/1965 | Hassa | 251—65 |

M. CARY NELSON, *Primary Examiner.*

ROBERT C. MILLER, *Assistant Examiner.*